(12) United States Patent
Langenfeld et al.

(10) Patent No.: US 9,616,987 B1
(45) Date of Patent: *Apr. 11, 2017

(54) MARINE ENGINES AND EXHAUST SYSTEMS FOR MARINE ENGINES

(71) Applicant: Brunswick Corporation, Lake Forest, IL (US)

(72) Inventors: Gregg D. Langenfeld, Fond du Lac, WI (US); David W. Heidel, Green Lake, WI (US); David J. Belter, Oshkosh, WI (US); Jeffrey J. Broman, Slinger, WI (US); Timothy S. Reid, Fond du Lac, WI (US)

(73) Assignee: Brunswick Corporation, Lake Forest, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/923,965

(22) Filed: Oct. 27, 2015

Related U.S. Application Data (63) Continuation of application No. 14/168,572, filed on Jan. 30, 2014, now Pat. No. 9,174,818, which is a
(Continued)

(51) Int. Cl.
*B63H 21/00* (2006.01)
*B63H 21/32* (2006.01)
(Continued)

(52) U.S. Cl.
CPC ......... *B63H 21/32* (2013.01); *B63H 20/245* (2013.01); *F01N 3/10* (2013.01)

(58) Field of Classification Search
CPC .......... B63H 20/245; B63H 21/32; F01N 3/10
See application file for complete search history.

(56) References Cited

U.S. PATENT DOCUMENTS 1,862,723 A 6/1932 Summers
2,305,295 A 10/1940 Lang et al.
(Continued)

FOREIGN PATENT DOCUMENTS

CA 1285883 7/1991
DE 664031 10/1938
(Continued)

OTHER PUBLICATIONS

Mercury Marine Service Manual: Models 175XR2 Sport Jet. Mercury Marine; Nov. 1997.

*Primary Examiner* — Stephen Avila
(74) *Attorney, Agent, or Firm* — Andrus Intellectual Property Law, LLP (57) ABSTRACT

Marine engine includes a cylinder block having first and second banks of cylinders that are disposed along a longitudinal axis and extend transversely with respect to each other in a V-shape so as to define a valley therebetween. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

20 Claims, 11 Drawing Sheets

Related U.S. Application Data continuation-in-part of application No. 13/306,700, filed on Nov. 29, 2011, now Pat. No. 8,668,538.

(51) Int. Cl.
*F01N 3/10* (2006.01)
*B63H 20/24* (2006.01)

(56) References Cited

U.S. PATENT DOCUMENTS

| | | |
|---|---|---|
| 2,318,006 A | 5/1943 | Mercier |
| 2,388,924 A | 11/1945 | Mercier |
| 3,768,248 A | 10/1973 | Grgurich et al. |
| 3,898,802 A | 8/1975 | Tadokoro et al. |
| 3,994,129 A | 11/1976 | Sakurai et al. |
| 4,082,068 A | 4/1978 | Hale |
| 4,188,784 A | 2/1980 | Hall |
| 4,346,676 A | 8/1982 | Tyner |
| 4,932,367 A | 6/1990 | Newman et al. |
| 4,965,997 A | 10/1990 | Suzuki et al. |
| 5,003,934 A | 4/1991 | Gubon et al. |
| 5,012,648 A | 5/1991 | Okumura |
| 5,337,706 A | 8/1994 | De Blasis |
| 5,346,417 A | 9/1994 | Isogawa |
| 5,374,209 A | 12/1994 | Wagner |
| 5,378,180 A | 1/1995 | Nakayama et al. |
| 5,463,990 A | 11/1995 | Rush, II et al. |
| 5,476,402 A | 12/1995 | Nakai et al. |
| 5,494,467 A | 2/1996 | Sohgawa et al. |
| 5,513,606 A | 5/1996 | Shibata |
| 5,553,586 A | 9/1996 | Koishikawa et al. |
| 5,556,311 A | 9/1996 | Fujimoto |
| 5,673,655 A | 10/1997 | Mishima |
| 5,762,051 A | 6/1998 | Okamoto |
| 5,778,833 A | 7/1998 | Kuranishi |
| 5,778,847 A | 7/1998 | Takahashi et al. |
| 5,822,985 A | 10/1998 | Yoshimura |
| 5,822,986 A | 10/1998 | Higashide |
| 5,855,495 A | 1/1999 | Kubo |
| 5,881,553 A | 3/1999 | Steenackers et al. |
| 5,887,907 A | 3/1999 | Kubota et al. |
| 5,893,783 A | 4/1999 | Hiraoka et al. |
| 5,911,605 A | 6/1999 | Wooldridge et al. |
| 5,911,608 A | 6/1999 | Nakayama et al. |
| 5,941,205 A * | 8/1999 | Hiraok .............. F02B 61/045 123/184.35 |
| 6,053,786 A | 4/2000 | Mishima et al. |
| 6,213,074 B1 | 4/2001 | Freese |
| 6,298,815 B1 | 10/2001 | Kashima et al. |
| 6,302,754 B1 | 10/2001 | Kashima |
| 6,338,660 B1 | 1/2002 | Fukuda |
| 6,543,429 B2 | 4/2003 | Osakabe et al. |
| 6,622,481 B1 | 9/2003 | Ruman et al. |
| 6,662,555 B1 | 12/2003 | Ishii |
| 6,722,126 B2 | 4/2004 | Kawamizu |
| 7,043,915 B2 | 5/2006 | Anello |
| 7,115,009 B2 | 10/2006 | Itoh et al. |
| 7,162,985 B2 | 1/2007 | Itoh et al. |
| 7,214,110 B1 | 5/2007 | Ehlers et al. |
| 7,361,067 B1 | 4/2008 | Smedema |
| 7,377,251 B2 | 5/2008 | Wizgall et al. |
| 7,451,734 B2 | 11/2008 | Weber |
| 7,704,111 B2 | 4/2010 | Ito et al. |
| 7,731,241 B2 | 6/2010 | Aoki et al. |
| 7,837,233 B2 | 11/2010 | Johnston et al. |
| 7,867,048 B2 | 1/2011 | Ochiai |
| 7,895,992 B2 | 3/2011 | Diggs et al. |
| 7,930,883 B2 | 4/2011 | Konakawa et al. |
| 7,954,314 B1 | 6/2011 | Bruestle et al. |
| 8,002,597 B2 | 8/2011 | Ochiai |
| 8,266,906 B2 | 9/2012 | Wu et al. |
| 8,366,501 B2 | 2/2013 | Kazuta |
| 8,668,538 B1 * | 3/2014 | Langenfeld ............ B63H 21/34 440/89 H |
| 8,801,482 B2 | 8/2014 | Ochiai et al. |
| 8,858,283 B2 | 10/2014 | Ochiai et al. |
| 8,978,372 B2 | 3/2015 | Ochiai et al. |
| 9,120,549 B2 | 9/2015 | Ochiai et al. |
| 9,174,818 B1 * | 11/2015 | Langenfeld ............ B63H 21/34 |
| 2002/0017252 A1 | 2/2002 | Onoue |
| 2003/0051683 A1 | 3/2003 | Okamoto |
| 2004/0142612 A1 | 7/2004 | Tawa et al. |
| 2004/0203299 A1 | 10/2004 | Kashima et al. |
| 2005/0263123 A1 | 12/2005 | Itoh et al. |
| 2006/0144369 A1 | 7/2006 | Takahashi et al. |
| 2007/0056281 A1 | 3/2007 | Arvan et al. |
| 2009/0007550 A1 | 1/2009 | Konakawa et al. |
| 2009/0078240 A1 | 3/2009 | Diggs et al. |
| 2009/0094965 A1 | 4/2009 | Takewaki |
| 2009/0215333 A1 | 8/2009 | Ochiai |
| 2010/0130079 A1 | 5/2010 | White et al. |
| 2010/0240269 A1 | 9/2010 | Ochiai |
| 2010/0242450 A1 | 9/2010 | Werni et al. |
| 2011/0223819 A1 | 9/2011 | Kazuta |
| 2013/0130577 A1 | 5/2013 | Ochiai et al. |
| 2013/0210295 A1 | 8/2013 | Davis et al. |

FOREIGN PATENT DOCUMENTS

| | | |
|---|---|---|
| DE | 2344864 | 4/1975 |
| DE | 2449753 | 4/1976 |
| DE | 3150001 | 6/1983 |
| DE | 3631312 | 7/1987 |
| DE | 4030652 | 4/1992 |
| DE | 4042415 | 11/1992 |
| DE | 4136799 | 5/1993 |
| DE | 19736500 | 12/1998 |
| DE | 69823516 | 4/2005 |
| DE | 202005019046 | 3/2006 |
| DE | 102004060845 | 6/2006 |
| DE | 102006043864 | 6/2007 |
| DE | 202008010025 | 11/2008 |
| DE | 102010034953 | 6/2011 |
| DE | 102011001195 | 9/2011 |
| DE | 102010015679 | 10/2011 |
| EP | 0685637 | 12/1999 |
| EP | 1069301 | 1/2001 |
| FR | 651848 | 2/1929 |
| GB | 436058 | 10/1935 |
| GB | 518518 | 2/1940 |
| GB | 674532 | 6/1952 |
| GB | 915230 | 1/1963 |
| JP | 5699005 | 12/1954 |
| JP | 55-010043 | 1/1980 |
| JP | 55010043 | 1/1980 |
| JP | 55-99005 | 8/1981 |
| JP | 06-146876 | 5/1994 |
| JP | 06146876 | 5/1994 |
| JP | 06-264757 | 9/1994 |
| JP | 1994264757 | 9/1994 |
| JP | 1997317464 | 12/1997 |
| JP | 2000356123 | 12/2000 |
| JP | 2001140636 | 5/2001 |
| JP | 200297948 | 4/2002 |
| JP | 2005097948 | 4/2002 |
| JP | 2003286842 | 10/2003 |
| JP | 200460557 | 2/2004 |
| JP | 2004293404 | 10/2004 |
| JP | 2005188351 | 7/2005 |
| JP | 2005188352 | 7/2005 |
| JP | 2006170020 | 6/2006 |
| JP | 2008031868 | 2/2008 |
| JP | 2008031897 | 2/2008 |
| JP | 2008031898 | 2/2008 |
| JP | 2009002265 | 1/2009 |
| JP | 4329396 | 9/2009 |
| JP | 2010242744 | 10/2010 |
| JP | 2011190704 | 9/2011 |
| JP | 2011-202578 | 10/2011 |
| JP | 2011202578 | 10/2011 |
| WO | 8904421 | 5/1989 |

* cited by examiner

MARINE ENGINES AND EXHAUST SYSTEMS FOR MARINE ENGINES

CROSS REFERENCE TO RELATED APPLICATION

This application is a continuation of U.S. patent application Ser. No. 14/168,572, filed Jan. 30, 2014, which is incorporated herein by reference in entirety, which is a continuation-in-part of U.S. patent application Ser. No. 13/306,700, filed Nov. 29, 2011, which is incorporated herein by reference in entirety.

FIELD

The present disclosure relates to marine engines and exhaust systems for marine engines, and particularly to V-style marine engines having one or more catalysts for treating exhaust gas.

BACKGROUND

U.S. Pat. No. 4,932,367; which is hereby incorporated herein in entirety by reference; discloses a V-type four-stroke cycle internal combustion engine having an exhaust manifold and an air intake manifold disposed in the valley of the V-engine. The exhaust from the cylinders passes through exhaust passages formed in the cylinder heads which discharge exhaust into the valley of the V-engine for collection in a central exhaust cavity provided in the exhaust manifold. A single exhaust discharge outlet is in communication with the central exhaust cavity for discharging exhaust therefrom.

U.S. Pat. No. 6,622,481; which is hereby incorporated herein in entirety by reference; discloses an exhaust treatment device for an internal combustion engine of a marine propulsion system. An outer chamber contains a first inner chamber within it and slidably supports the inner chamber. An exhaust inlet conduit directs a stream of exhaust gas from a cylinder of the internal combustion engine directly into the inner chamber. The inner and outer chambers are supported relative to each other to allow relative movement of these two components in response to changes in the differential temperature between the two components. A rail system slidably supports the inner chamber relative to the outer chamber. The exhaust treatment device comprises a liquid cooled housing surrounding the inner and outer chambers. Exhaust gas is directed through the inner chamber and then into the outer chamber at a closed end of the exhaust treatment device. Exhaust gas then flow through the outer chamber to an exhaust conduit of the marine propulsion system.

U.S. Pat. No. 7,954,314; which is hereby incorporated herein in entirety by reference; discloses an engine having a cavity so that a catalyst member can be contained within the engine when an engine head portion is attached to an engine block portion. This attachment of the engine head portion and engine block portion, which forms the engine structure, captivates the catalyst member within the cavity without the need for additional brackets and housing structures. The cavity is preferably located above or at the upper regions of first and second exhaust conduits which direct exhaust upwardly from the engine head portion toward the cavity and downwardly from the cavity within the engine block portion. The first and second exhaust conduits are preferably formed as integral structures within the engine head portion and engine block portion.

SUMMARY

This disclosure is the product of the present inventors' research and development of exhaust systems for marine engines, and particularly four-stroke V-style marine engines. During such research and development, the inventors recognized that exhaust back-pressure (i.e. pressure in the manifold of the exhaust system) limits the available power of the engine. Back-pressure is typically governed by the pressure drop from the exhaust valve to the atmosphere. The inventors also recognized that adding a catalyst to the exhaust stream adds more back-pressure than is desirable and results in further loss of power. Further, the inventors recognized that bends in exhaust pipes create higher pressure drop than straight sections and hence higher back-pressure. The pressure drop through a bend has also been found to be higher if the bend is sharp and/or if the angle of the bend is higher. However, because of packaging constraints, bends typically need to be sharp or else they will take up too much space under the cowl.

This disclosure provides examples of the inventors' solutions to these problems. In one example, a marine engine has a cylinder block with first and second banks of cylinders that are disposed along a longitudinal axis and extend transversely with respect to each other in a V-shape so as to define a valley therebetween. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

In other examples, the conduit includes a first branch conduit receiving the exhaust gas from the first bank of cylinders, a second branch conduit receiving the exhaust gas from the second bank of cylinders, and a third branch conduit receiving the exhaust gas from the first and second branch conduits and discharging the exhaust gas to the catalyst receptacle. The conduit merges the exhaust gas from the first and second branch conduits together within a 180-degree bend.

In other examples, a marine engine comprises a cylinder block having first and second banks of cylinders that are disposed along a longitudinal axis and extend transversely with respect to each other in a V-shape so to define a valley therebetween. A conduit is disposed at least partially in the valley and conveys exhaust gas from the marine engine. The conduit reverses direction only once with respect to the longitudinal axis. The conduit comprises a single 180-degree bend. The valley has a center located proximate to the cylinder block and the 180-degree bend carries the exhaust gas radially outwardly, away from the center of the valley. The conduit includes a first branch conduit receiving exhaust gas from the first bank of cylinders, a second branch conduit receiving the exhaust gas from the second bank of cylinders, and a third branch conduit receiving the exhaust gas from the first and second branch conduits and discharging the exhaust gas to the catalyst receptacle. The third branch conduit carries the exhaust gas from a vertically upward directional flow to a vertically downward directional flow. The third branch conduit comprises a first conduit portion receiving exhaust gas from the first branch conduit, a second conduit portion receiving the exhaust gas from the second branch conduit, and a third conduit portion receiving the exhaust gas from the first and second conduit portions. The first and second conduit portions are separated by a dividing baffle.

DETAILED DESCRIPTION OF THE DRAWINGS

In the present disclosure, certain terms have been used for brevity, clearness and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
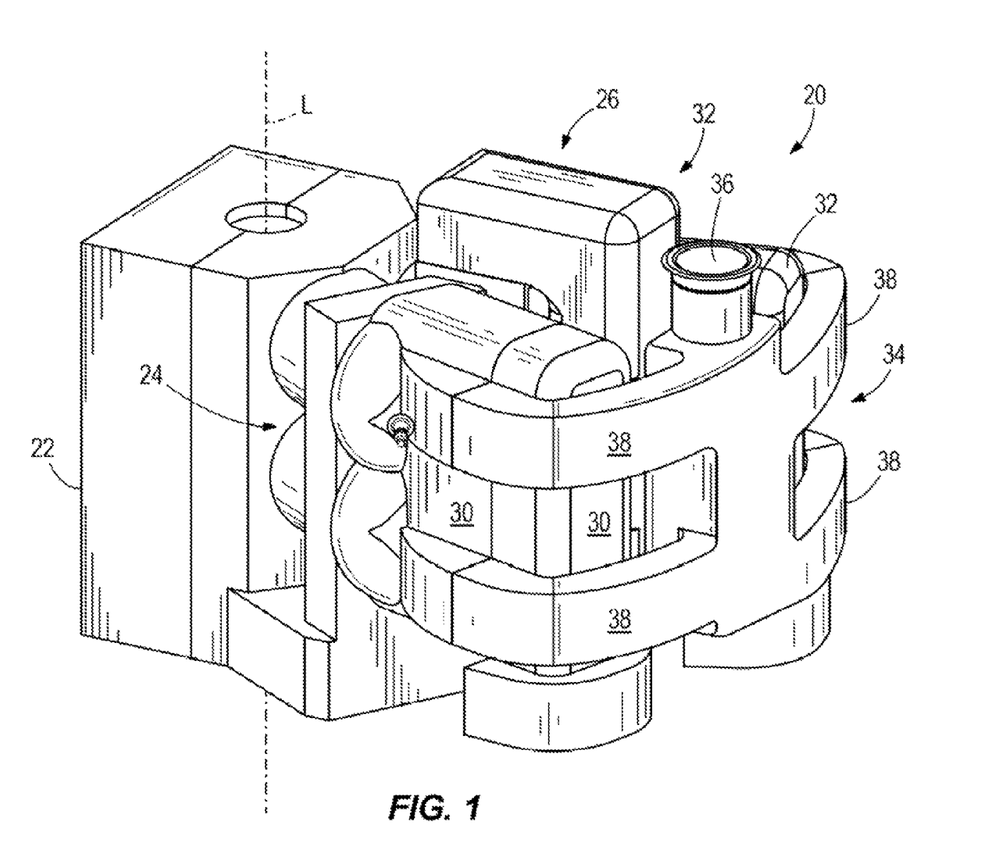
FIG. 1 is a perspective view of a four cylinder, four stroke, V-style internal combustion engine for a marine drive.

FIG. 1 depicts a marine engine 20, which in the example shown is a four cylinder, four stroke, V-style engine for an outboard motor. It should be noted however that while the examples that are shown and described herein are four cylinder, four stroke, V-style marine engines, the concepts of the present disclosure are also fully applicable to marine engines having any number of cylinders, including but not limited to six and eight cylinder V-style marine engines in outboard, inboard and inboard/outboard marine engine configurations. In FIG. 1, the marine engine 20 includes a cylinder block 22 on which first and second banks of aligned cylinders 24, 26 are aligned with respect to a longitudinal axis L and extend transversely with respect to each other in a V-shape so as to define a valley 28 (see FIGS. 2 and 3) there between. First and second cylinder heads 30, 32 are located on the first and second banks of aligned cylinders 24, 26, respectfully. An intake manifold 34 is also shown in FIG. 1. The intake manifold 34 receives intake air via inlet port 36 and conveys the intake air to the respective first and second banks of aligned cylinders 24, 26 for the combustion process. In the example shown, an intake air passageway 38 is provided for each cylinder in the first and second banks of aligned cylinders 24, 26. Other configurations of the intake manifold 34 can be employed and the example shown is not intended to be limiting on the present disclosure. As is conventional, intake air supplied via the intake manifold 34 is utilized during the combustion process in the marine engine 20.

Figure 2:
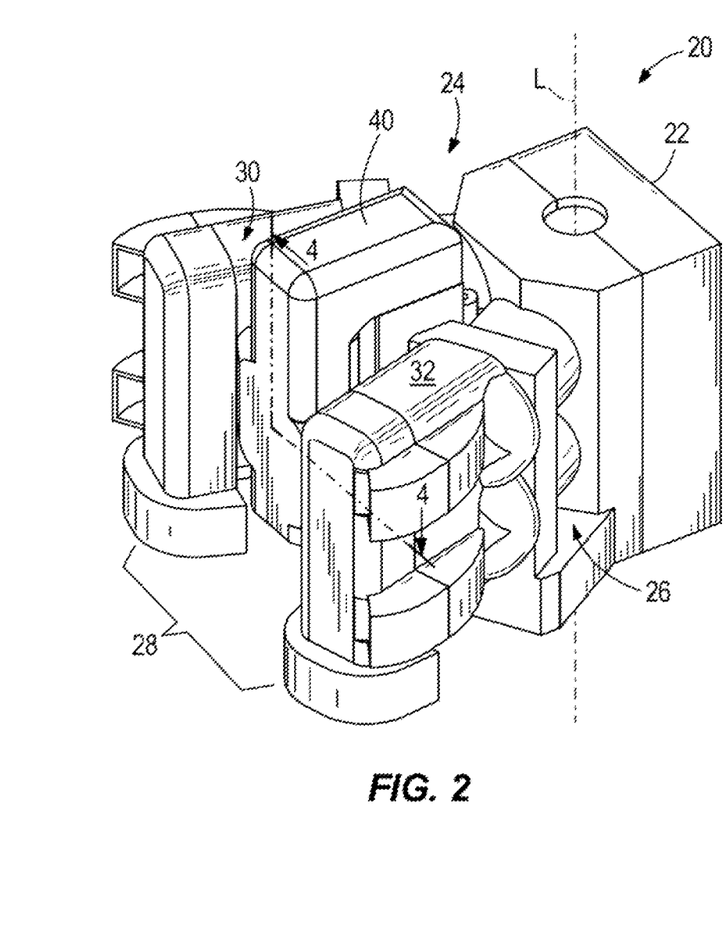
FIG. 2 is a view like FIG. 1, wherein the intake manifold of the engine is removed.
Figure 3:
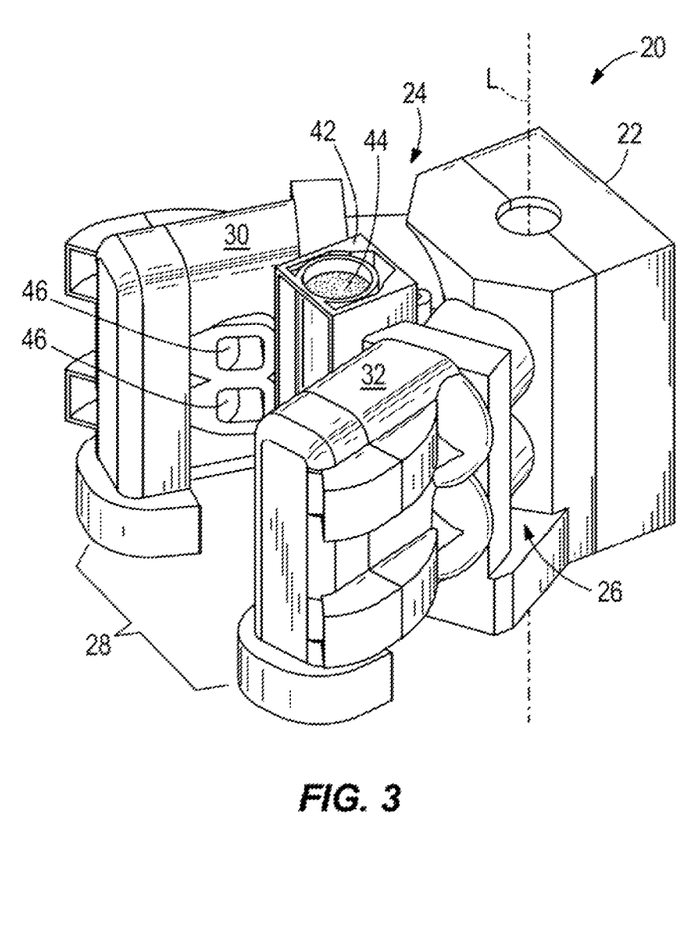
FIG. 3 is a view like FIG. 2, wherein the exhaust manifold is removed and showing a catalyst receptacle disposed in the valley defined by the cylinders of the engine.

FIGS. 2 and 3 depict the marine engine 20 without the intake manifold 34. An exhaust manifold 40 conveys exhaust gas from the first and second cylinder heads 30, 32 to a catalyst receptacle 42 disposed in the valley 28. In this example, the exhaust manifold 40 is disposed in the valley 28 and receives exhaust gas from the first and second banks of aligned cylinders 24, 26 via the first and second cylinder heads 30, 32. FIG. 3 depicts the marine engine 20 having the exhaust manifold 40 removed and shows the catalyst receptacle 42 containing at least one catalyst 44 that treats exhaust gas from the first and second banks of aligned cylinders 24, 26. The catalyst receptacle 42 has an inner cylindrical shape; however other shapes and sizes of catalyst receptacles can be employed. Optionally, the catalyst receptacle 42 can be cast in to the cylinder block 22.

Figure 4:
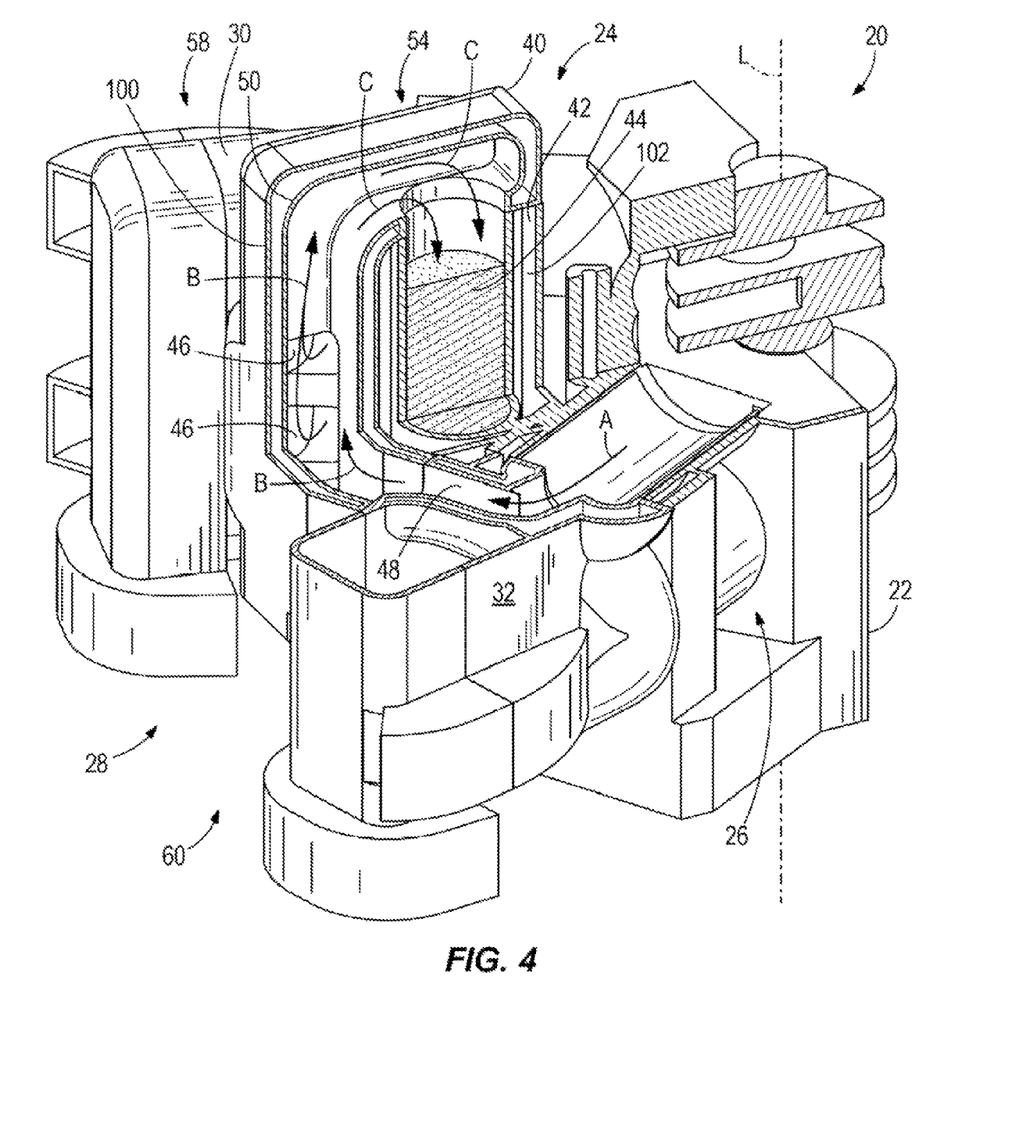
FIG. 4 is a view of section 4-4 taken in FIG. 2.

FIG. 4 depicts the marine engine 20 at section 4-4 taken in FIG. 2. The exhaust manifold 40 has first ports 46 receiving exhaust gas from the first cylinder head 30, second ports 48 receiving exhaust gas from the second cylinder head 32, and a conduit 50 conveying the exhaust gas from the first and second ports 46, 48 to the catalyst receptacle 42. The number of ports can vary from that which is shown and described. In the example shown, ports 46, 48 are provided for each cylinder in the first and second banks of aligned cylinders 24, 26, respectively. FIG. 4 shows two ports 46 and one port 48. In this example, a second port 48, which is not shown in this view, is also provided for the second bank of aligned cylinders 26. The first ports 46 and second ports 48 are inwardly oriented towards the valley 28 and the exhaust manifold 40 is configured to receive and mix exhaust gas from both of the first and second ports 46, 48 in the conduit 50. In this configuration, the exhaust manifold 40 extends out from the end of the valley 28 and then back into the valley 28 at a bend 54, which in the example shown is a 180-degree bend. Exhaust gas is conveyed through the bend 54 to the catalyst receptacle 42 wherein the exhaust gas is treated by catalyst 44. In this configuration, from the first and second ports 46, 48, the conduit 50 only reverses direction once with respect to the longitudinal axis L, which reversal is provided by the 180-degree bend 54.

As can be seen from FIG. 4, the valley 28 has first and second opposite (in this example, top and bottom) ends 58, 60. In this example, the exhaust manifold 40 extends out from and back into only one of the first and second ends 58, 60, namely the first end 58 in this example. Exhaust gas thus flows transversely at arrows A from the first and second banks of aligned cylinders 24, 26 through the first and second ports 46, 48. Once into the exhaust manifold 40, exhaust gas flows transversely with respect to the first and second ports 46, 48 (longitudinally to the engine), out of the first end 58 of the valley 28 and through the conduit 50 at arrow B. Once reversing direction through the bend 54 at arrow C, exhaust gas flows back into the first end 58 of the valley 28 and into the catalyst receptacle 42 for treatment by the catalyst 44. After flowing through the catalyst 44, exhaust gas exits the catalyst receptacle 42 via the second end 60 of the valley 28 for disposal from the propulsion system via conventional means.

A cooling jacket 100 can be provided around the exhaust manifold 40. Cooling fluid (not shown), such as water drawn from the body of water in which the vessel is operating can be pumped through the cooling jacket in a conventional manner to maintain the exhaust manifold at a preferred temperature. A cooling jacket 102 can also be provided on the catalyst receptacle 42 to maintain the catalyst and/or catalyst receptacle at a preferred temperature.

The exhaust system shown in FIGS. 1-4 has been found by the present inventors to provide significant packaging and cost advantages and provides an arrangement that meets space constraints and minimizes weight. By routing the exhaust gas through only a single bend 54 in the exhaust manifold 40 pressure drop is decreased and thus efficiency of the marine engine 20 is advantageously increased.

Figure 5:
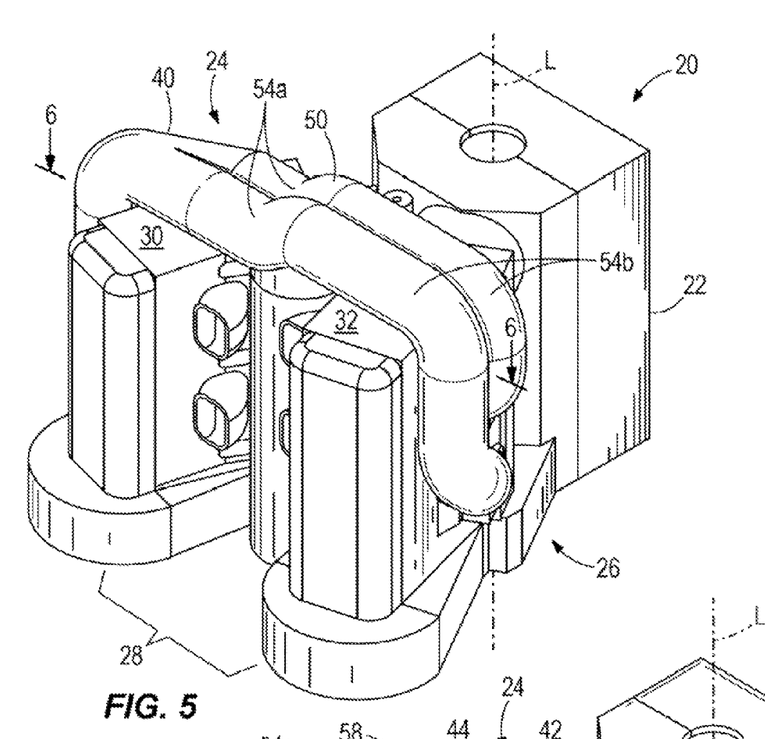
FIG. 5 is a perspective view of another example of a four cylinder, four stroke, V-style internal combustion engine for a marine drive.
Figure 6:
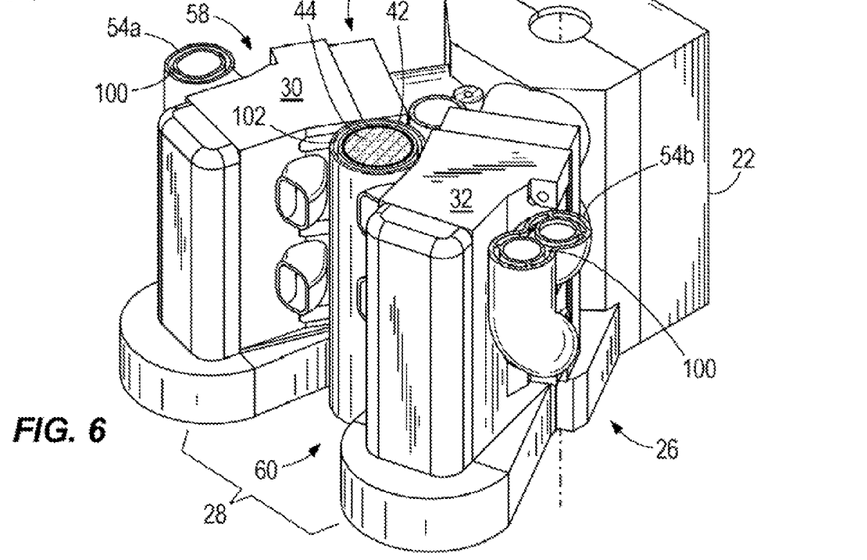
FIG. 6 is a view like FIG. 5, showing a catalyst receptacle disposed in the valley defined by the cylinders of the engine.

FIGS. 5 and 6 depict another example of the marine engine 20 having like reference numbers applied to like structures of the examples of FIGS. 1-4. In FIGS. 5 and 6, the ports 46, 48 are outwardly oriented with respect to the valley 28. In this example, the conduit 50 has opposing 180-degree bends 54*a* extending inwardly from the first ports 46 to the catalyst receptacle 42 and opposing 180-degree bends 54*b* extending inwardly from the second ports 48 to the catalyst receptacle 42. Thus, the exhaust manifold 40 extends inwardly from the outwardly oriented first and second ports 46, 48 into only one of the first and second ends 58, 60 of the valley 28 (in this case the first end 58). As such, the exhaust gas flows transversely from the outwardly oriented first and second ports 46, 48, through the conduits 50, reversing direction with respect to the longitudinal axis through the opposing 180-degree bends 54*a*, 54*b* and then into the first end 58 of the valley 28 to the catalyst receptacle 42, wherein the exhaust gas is treated by the catalyst 44. Again, by routing the exhaust gas through only a single 180-degree bend in the exhaust manifold 40 (i.e. bends 54*a* and 54*b* for each respective port 46, 48), the exhaust gas only reverses direction once with respect to the longitudinal axis and pressure drop is decreased and thus efficiency of the marine engine 20 is advantageously increased.

Figure 7:
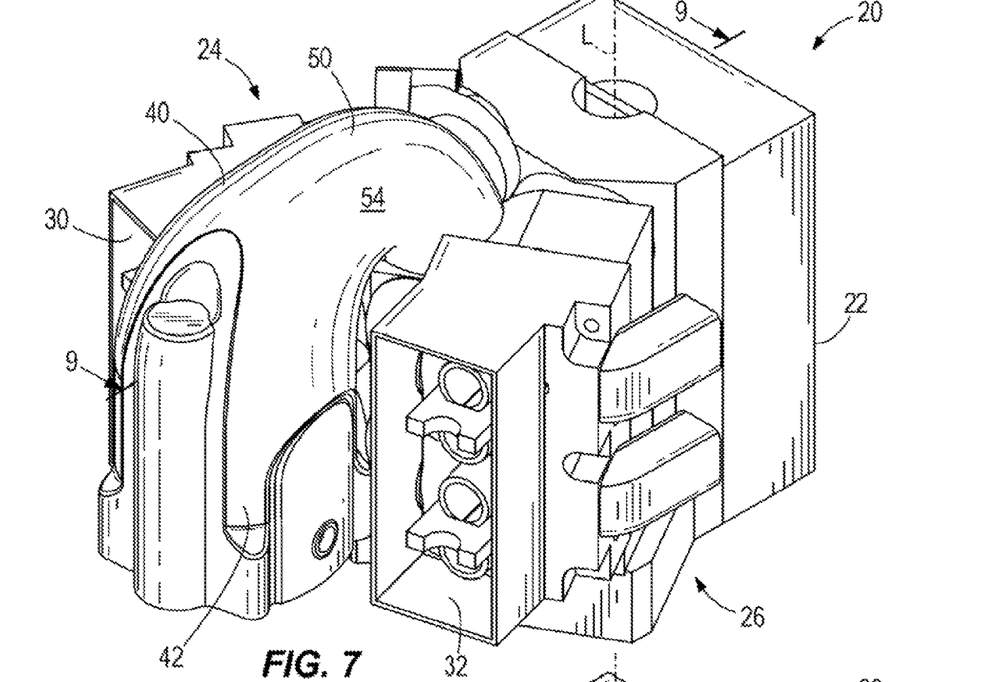
FIG. 7 is a perspective view of another example of a four cylinder, four stroke, V-style internal combustion engine for a marine drive.
Figure 8:
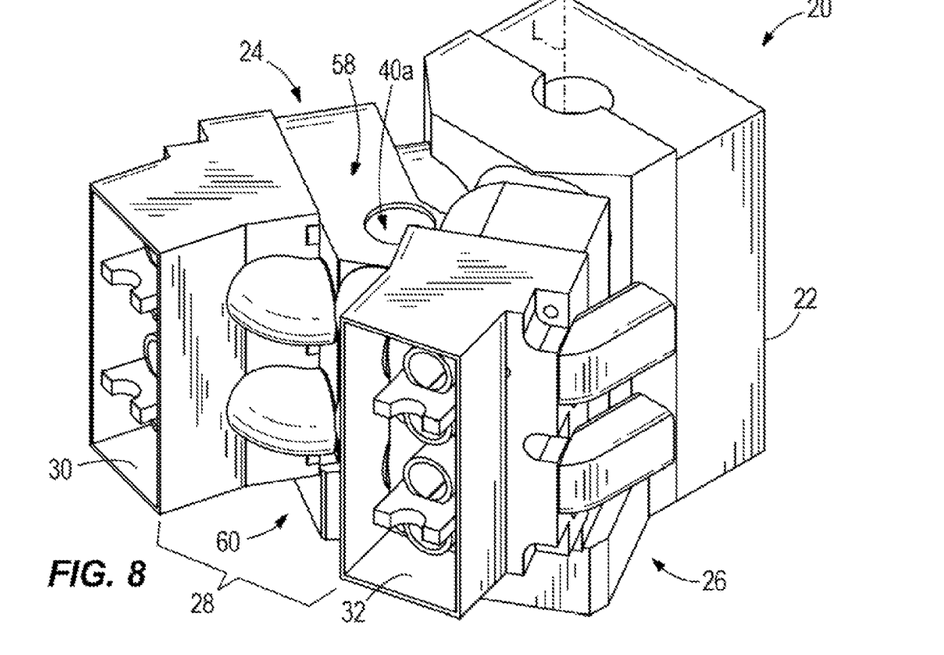
FIG. 8 is a view like FIG. 7, showing a catalyst receptacle disposed in the valley defined by the cylinders of the engine.
Figure 9:
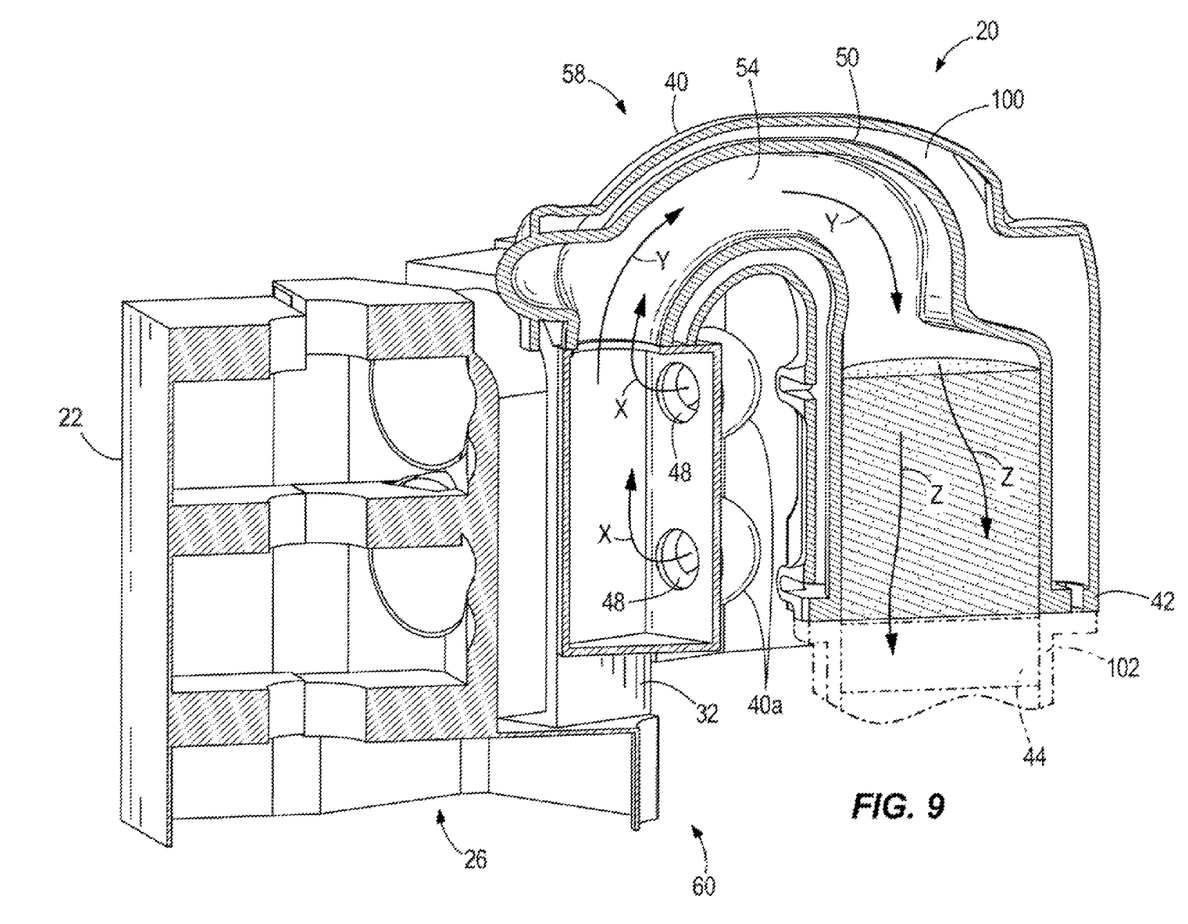
FIG. 9 is a view of section 9-9 taken in FIG. 7.

FIGS. 7-9 depict a marine engine 20 similar to the examples shown herein above, and having like reference numbers applied to similar structures. In FIGS. 7-9, the exhaust manifold 40 is located at the center of the valley 28 and has a portion 40*a* that is cast into the cylinder block 22. In this example, exhaust gas flows transversely from the first and second ports 46, 48, as shown in FIG. 9 at arrow X, through conduit 50 and reverses direction with respect to the longitudinal axis through the 180-degree bend 54, as shown at arrow Y, and then into the catalyst receptacle 42 located in the valley 28, as shown at arrow Z. The conduit 50 only reverses direction once with respect to the longitudinal axis L.

Figure 10:
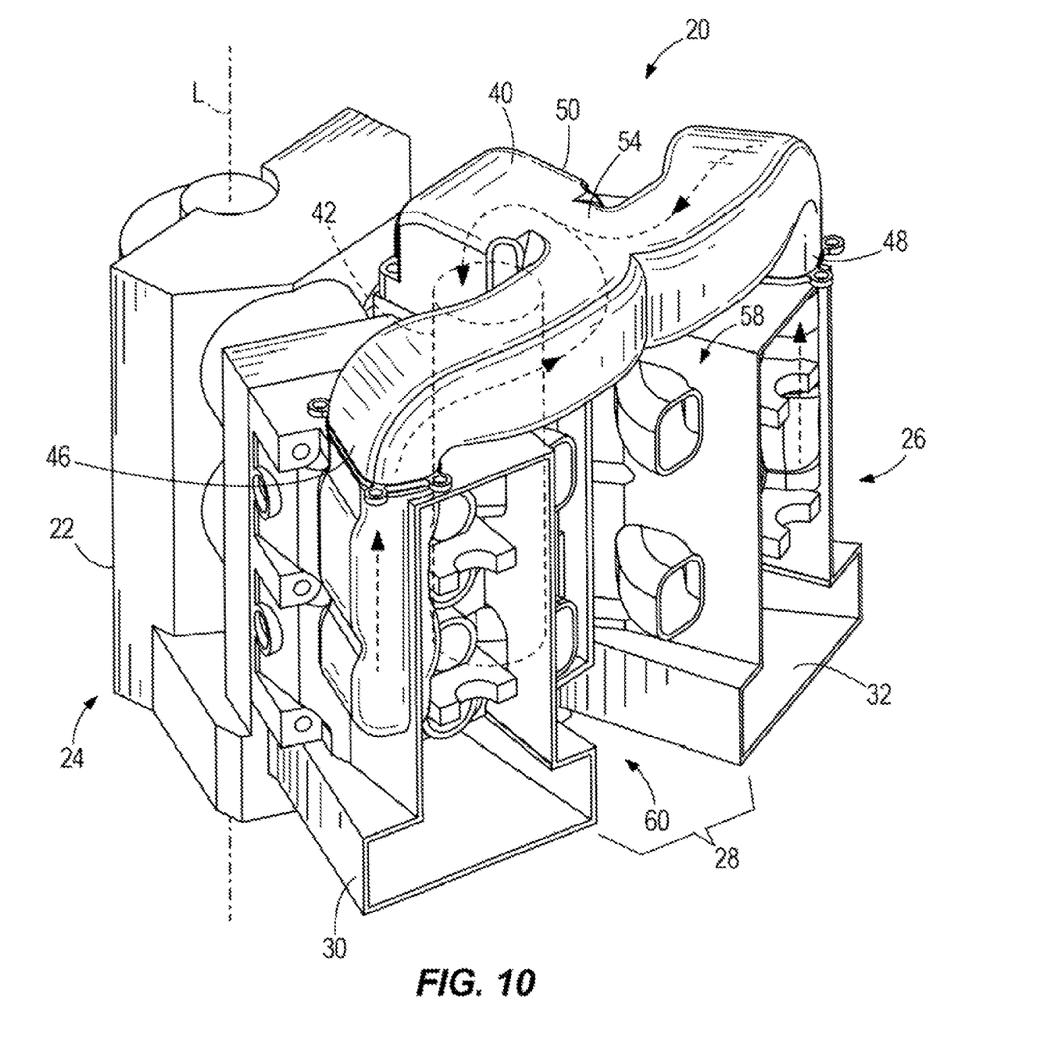
FIG. 10 is a perspective view of another example of a four cylinder, four stroke, V-style internal combustion engine for a marine drive.
Figure 11:
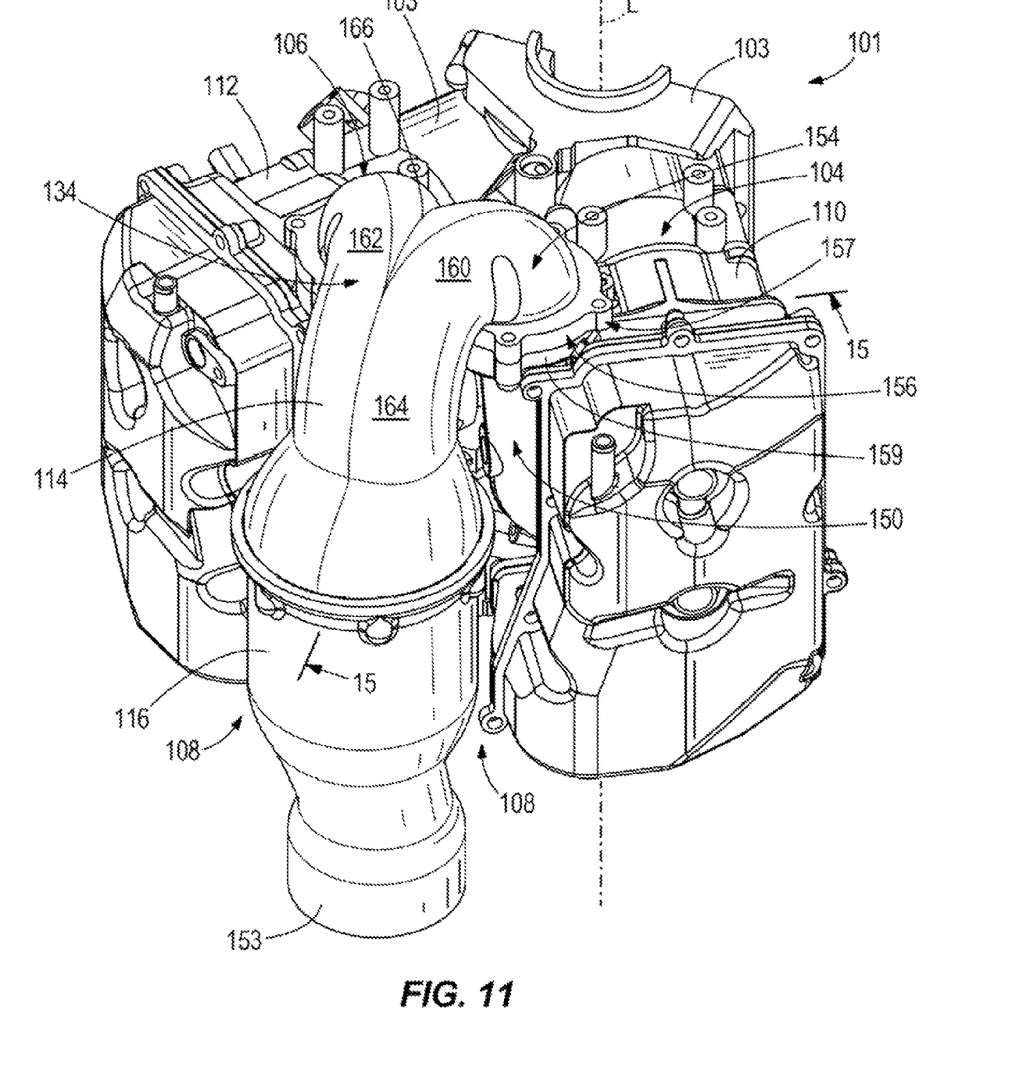
FIG. 11 is a perspective view of another example of a V-style internal combustion engine for a marine drive.

FIG. 10 depicts a marine engine 20 similar to the examples shown herein above, and having like reference numbers applied to similar structures. In FIG. 10, the first and second ports 46, 48 include single ports 46, 48 located at one end of the first and second cylinder heads 30, 32. The catalyst receptacle 42 is cast into the cylinder block 22. Again, the conduit 50 only reverses direction once with respect to the longitudinal axis L.

The present disclosure thus provides a marine engine 20 having an exhaust system that comprises a catalyst receptacle 42 disposed in a valley 28 formed by the V-shape of first and second banks of aligned cylinders 24, 26. The catalyst receptacle 42 contains a catalyst 44 that treats exhaust gas from the first and second banks of aligned cylinders 24, 26. An exhaust manifold 40 conveys exhaust gas from first and second cylinder heads 30, 32 to the catalyst receptacle 42. The exhaust manifold 40 has a first port 46 receiving exhaust gas from the first cylinder head 30, a second port 48 receiving exhaust gas from the second cylinder head 32, and a conduit 50 conveying the exhaust gas from the first and second ports 46, 48 to the catalyst receptacle 42. Exhaust gas thus flows from the first and second cylinder heads 30, 32 and transversely through the first and second ports 46, 48. Once into the exhaust manifold 40, exhaust gas flows transversely with respect to the first and second ports 46, 48, out of the valley 28, and through the conduit 50. Exhaust gas flows back into the first end 58 of the valley 28 and into the catalyst receptacle 42 for treatment by the catalyst 44.

Figure 12:
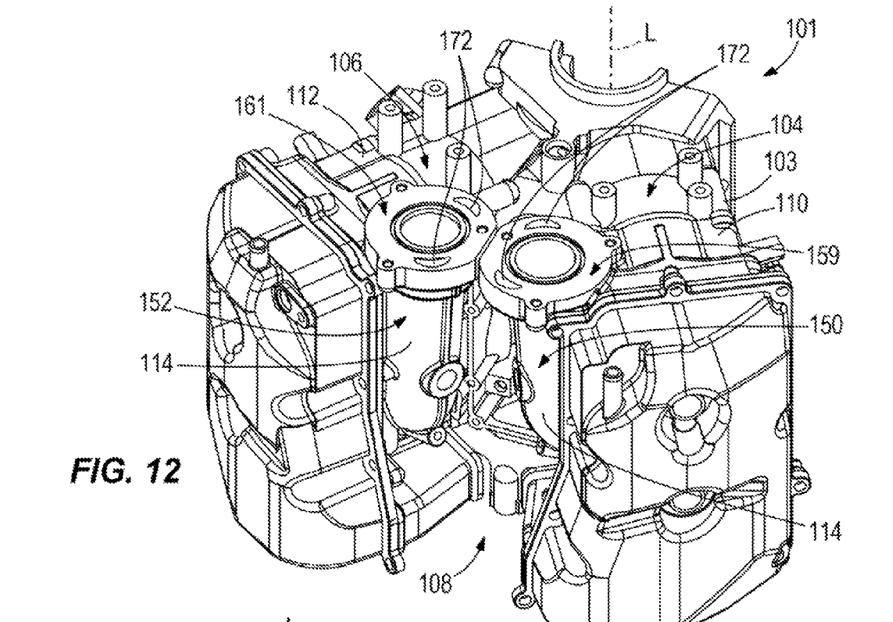
FIG. 12 is a view like FIG. 11, having an exhaust manifold removed therefrom.
Figure 13:
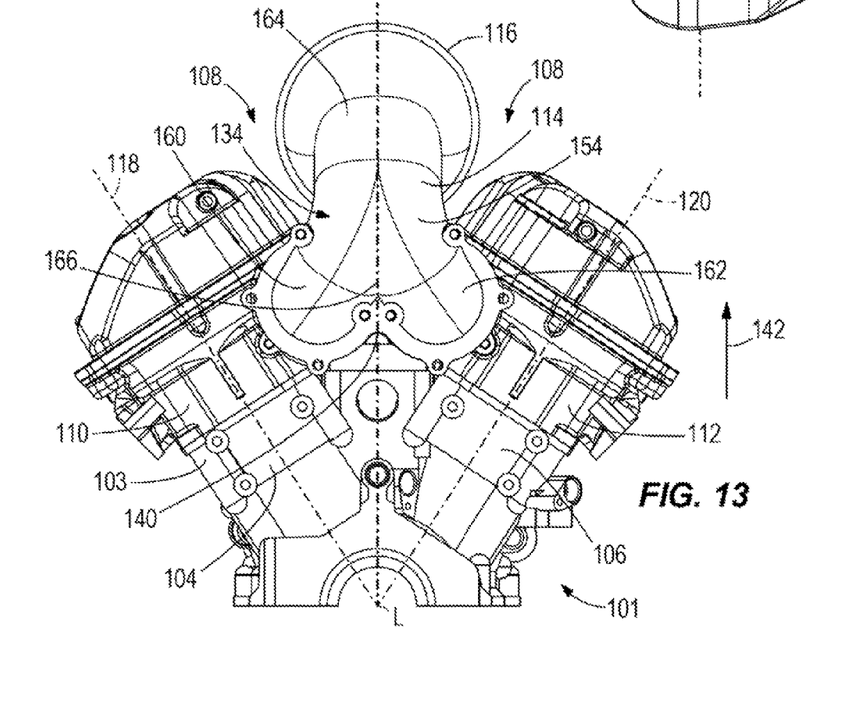
FIG. 13 is a top view of the example shown in FIG. 11.

FIGS. 11-15 depict another example of a marine engine 101, which in the example shown is a four cylinder, four stroke, V-style engine for an outboard motor. As with the previous examples, it should be noted that the concepts of this embodiment are also fully applicable to engines having any number of cylinders, including but not limited to six and eight cylinder V-style marine engines in outboard, inboard and inboard/outboard marine engine configurations. In FIGS. 11-15, the marine engine 101 includes a cylinder block 103 on which first and second banks of cylinders 104, 106 are aligned with respect to a longitudinal axis L. The first and second banks of cylinders 104, 106 extend transversely with respect to each other in a V-shape so as to define a valley 108 (e.g. see FIG. 13) therebetween. As shown in FIG. 13, the valley 108 is defined between the center lines 118, 120 of the respective first and second banks of cylinders 104, 106. As shown, in FIG. 15, the valley 108 has a top end designated at 122 along an uppermost end of the cylinder block 103 and a bottom end 124 along a lowermost end of the cylinder block 103. First and second cylinder heads 110, 112 are located on the first and second banks of cylinders 104, 106, respectively.

A conduit 114 conveys exhaust gas from the first and second banks of cylinders 104, 106 to a catalyst receptacle 116 disposed in the valley 108. The conduit 114 can be formed of one or more than one components connected together in series and can extend from the first and second banks of cylinders 104, 106 to the catalyst receptacle 116 and optionally beyond the catalyst receptacle 116 to an outlet 153 for discharging exhaust gas to an outboard motor housing component and/or outside the outboard motor. The conduit 114 can form part of or all of the catalyst receptacle 116. As explained further hereinbelow, optionally, portions of the conduit 114 can be cast with the cylinder block 103. Other portions of the conduit 114 can be formed separately from the cylinder block and attached thereto. The catalyst receptacle 116 contains a catalyst 126 that treats exhaust gas from the first and second banks of cylinders 104, 106. The catalyst receptacle 116 has a cylindrical inner perimeter 128; however other shapes and sizes of catalyst receptacles can be employed.

An intake manifold (not shown) receives and conveys intake air via intake ports 105 (see FIG. 14) to the respective first and second banks of cylinders 104, 106 for the combustion process. In this example, respective pairs of the intake ports 105 are located outside of the valley 108, on opposite sides of the first and second banks of cylinders 104, 106. Various configurations of the intake manifold can be employed, one example of which is the intake manifold 34 shown in FIG. 1 and described herein above. As is conventional, intake air supplied via the noted intake manifold is utilized during the combustion process in the marine engine 101.

Figure 14:
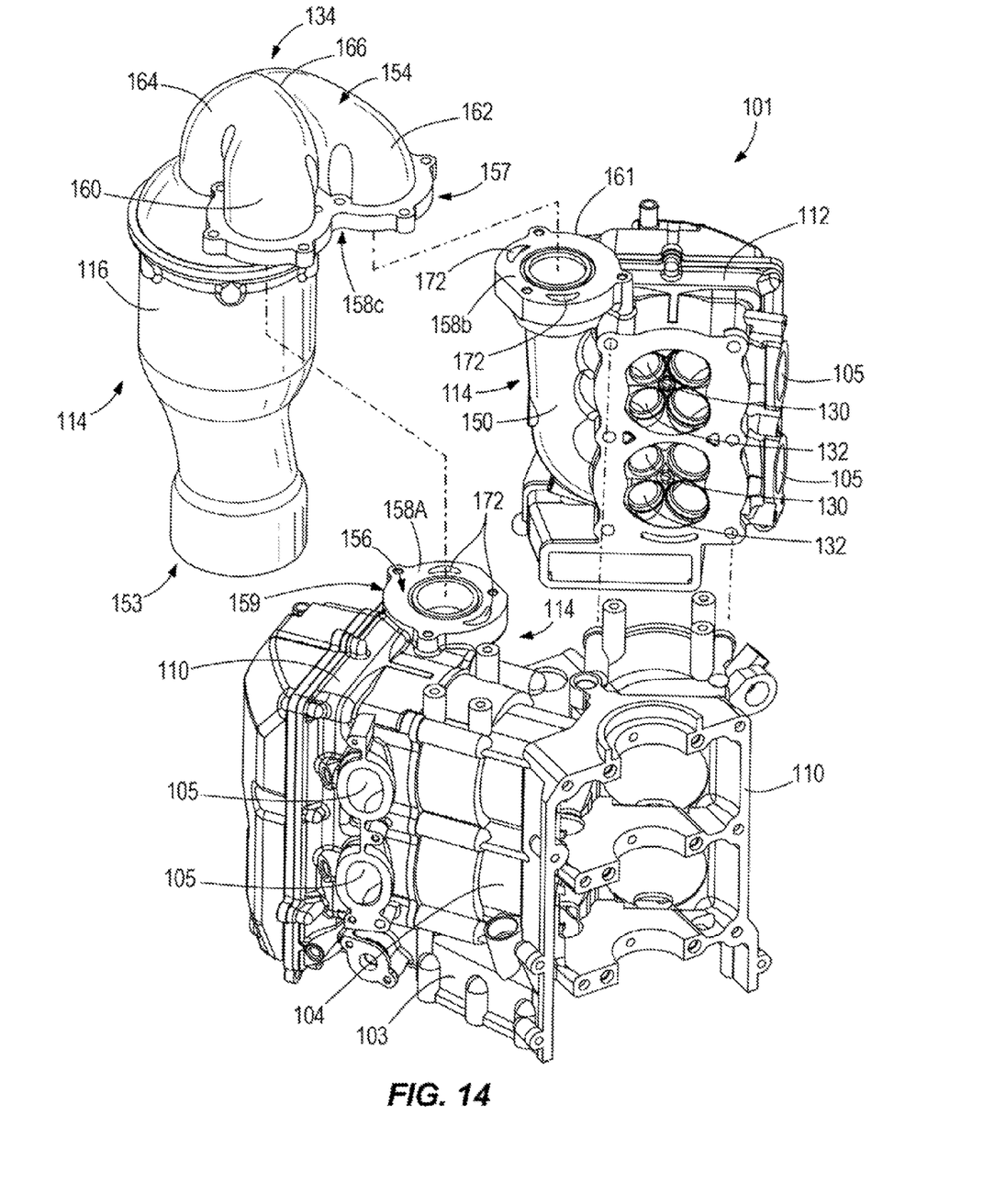
FIG. 14 is an exploded view of the embodiment shown in FIG. 11.
Figure 15:
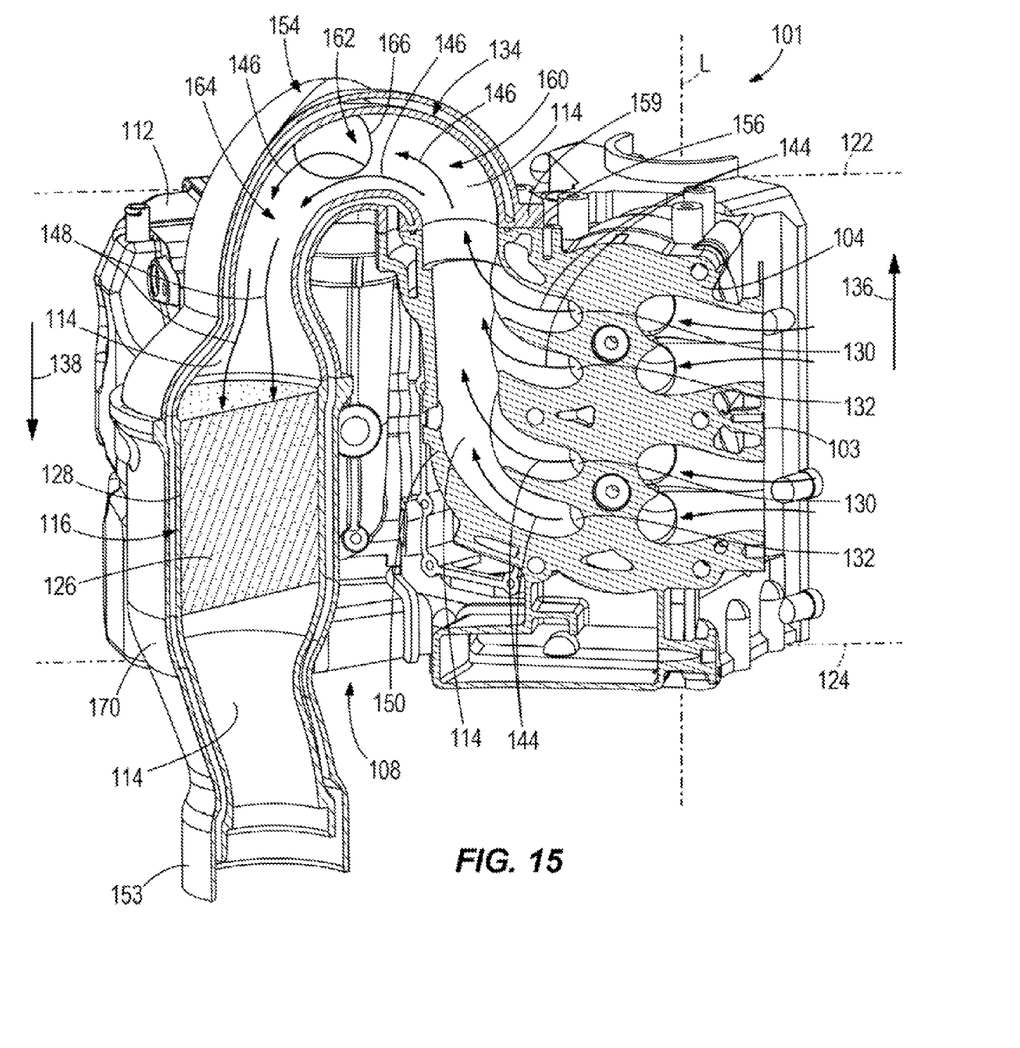
FIG. 15 is a view of section 15-15, taken in FIG. 11.

Referring to FIGS. 14 and 15, the conduit 114 receives exhaust gas from each of the first and second banks of cylinders 104, 106 via first and second ports 130, 132 on each cylinder in the banks 104, 106. The conduit 114 includes a single 180-degree bend 134 that is located higher than the first and second banks of cylinders 104, 106 with respect to the longitudinal axis L. As shown in FIG. 15, the 180-degree bend 134 conveys the exhaust gas from a vertically upward directional flow shown at arrow 136 to a vertically downward directional flow shown at arrow 138 with respect to the longitudinal axis L. As shown in FIG. 13, the valley 108 has a center 140 located proximate to the cylinder block 103. The 180-degree bend 134 of the conduit 114 carries the exhaust gas radially outwardly as shown at arrow 142, away from the center 140 of the valley 108. As shown in FIG. 15, at least a portion of the conduit 114 extends out from (i.e. above) the top end 122 of the valley 108 and then back into (i.e. below) the top end 122 of the valley 108 with respect to the longitudinal axis L. Thus, at arrows 144, exhaust gas flows transversely from the first and second ports 130, 132. At arrows 146, exhaust gas flows through the 180-degree bend 134. At arrows 148, exhaust gas flows into and through the catalyst 126 in the catalyst receptacle 116.

Referring to FIG. 12, the conduit 114 includes a first branch conduit 150 receiving exhaust gas from the first bank of cylinders 104 and a second branch conduit 152 receiving exhaust gas from the second bank of cylinders 106. In this example, the first and second branch conduits 150, 152 are separated and are cast in the cylinder heads 110, 112 with the first and second banks of cylinders 104, 106. Referring to FIG. 14, the conduit 114 further includes a third branch conduit 154 receiving exhaust gas from the first and second branch conduits 150, 152 and discharging the exhaust gas through the catalyst receptacle 116. The exhaust gas that flows through the catalyst 126 is discharged through the lower end 153 of the third branch conduit 154 for subsequent discharge from the propulsion device in which the marine engine 101 is located.

A sealing interface 156 (FIG. 15) is provided between an upstream end 157 of the third branch conduit 154 and downstream ends 159, 161 of the first and second branch conduits 150, 152. The third branch conduit 154 is attached to the first and second branch conduits 150, 152 by a plurality of fasteners that extend through the sealing interface 156. As shown in FIG. 14, the sealing interface 156 includes planar seal surfaces 158a, 158b, 158c disposed on the first, second and third branch conduits 150, 152 and 154. The planar sealing surface 158c of the third branch conduit 154 mates with the planar sealing surfaces 158a. 158b of the first and second branch conduits 150, 152. As shown in FIG. 15, the sealing interface 156 is located higher than the first and second banks of cylinders 106 with respect to the longitudinal axis L. The sealing interface 156 transversely extends to the longitudinal axis L.

Referring to FIG. 15, the third branch conduit 154 merges exhaust gas from the first and second branch conduits 150, 152 together at the 180-degree bend 134. The third branch conduit 154 comprises a first conduit portion 160 that receives exhaust gas from the first branch conduit 150, a second conduit portion 162 that receives exhaust gas from the second branch conduit 152, and a third conduit portion 164 that receives exhaust gas from the first and second conduit portions 160, 162. The first and second conduit portions 160, 162 form a 90-degree bend. The third conduit portion 164 forms a 90-degree bend. Together, the 90-degree bends form the noted 180-degree bend 134. The conduit 114 merges the exhaust gas from the first and second branch conduits 150, 152 together within the noted 180-degree bend 134.

A cooling jacket 170 is disposed along the conduit 114 from the lower end 153 to the sealing interface 156. The cooling jacket 170 carries cooling water for cooling the noted exhaust conduit 114 and catalyst 126. At the sealing interface 156, cooling water flows into cooling passages 172 in the first and second branch conduits 150, 152 (see FIG. 12) for cooling additional portions of the engine 101.

The present disclosure thus provides a marine engine 101 comprising a cylinder block 103 having first and second banks of cylinders 104, 106 that are disposed along a longitudinal axis L and extend transversely with respect to each other in a V-shape so as to define a valley 108 therebetween. A catalyst receptacle 116 is disposed at least partially in the valley 108 and contains at least one catalyst 126 that treats exhaust from the marine engine 101. A conduit 114 conveys exhaust gas from the marine engine 101 to the catalyst receptacle 116. The conduit 114 receives the exhaust gas from the first and second banks of cylinders 104, 106 and conveys the exhaust gas to the catalyst receptacle 116. The conduit 114 reverses direction only once with respect to the longitudinal axis L. First and second ports 130, 132 communicate with each of the first and second banks of cylinders 104, 106, respectively. The conduit 114 receives exhaust gas from the first and second ports 130, 132. The conduit 114 includes a single 180-degree bend 134 that is located higher than the first and second banks of cylinders 104, 106 with respect to the longitudinal axis L. The 180-degree bend 134 conveys the exhaust gas from a vertically upward directional flow 136 to a vertically downward directional flow 138 with respect to the longitudinal axis L. The valley 108 has a center 140 located proximate to the cylinder block 103. The 180-degree bend 134 carries the exhaust gas radially outwardly as shown at 142, away from the center 140 of the valley 108. A portion of the conduit 114 extends out from a top end 122 of the valley 108 and then back into the top end 122 with respect to the longitudinal axis L. Exhaust gas flows transversely at 144 from the first and second ports 130, 132, through the 180-degree bend 134 at 146, and then into the catalyst receptacle 116 at 148. The conduit 114 includes a first branch conduit 150 receiving exhaust gas from the first bank of cylinders 104, a second branch conduit 152 receiving exhaust gas from the second bank of cylinders 106, and a third branch conduit 154 receiving exhaust gas from the first and second branch conduits 150, 152 and discharging the exhaust gas to the catalyst receptacle 116. The sealing interface 156 is disposed between the third branch conduit 154 and the first and second branch conduits 150, 152 and attached thereto by at least one fastener that extends through the sealing interface 156. The sealing interface 156 includes a planar seal surface 158a, 158b, 158c that extends transversely to the longitudinal axis L. The sealing interface 156 is located higher than the first and second banks of cylinders 104, 106 with respect to the longitudinal axis L. The third branch conduit 154 merges exhaust gas from the first and second branch conduits 150, 152.

What is claimed is:

1. A marine engine comprising:
   a cylinder block comprising first and second banks of cylinders that are disposed along a longitudinal axis and extend transversely with respect to each other in a V-shape so as to define a valley; and
   an exhaust manifold that conveys exhaust gases from the marine engine;

wherein the exhaust manifold comprises a first port that receives the exhaust gases from the first bank of cylinders, a second port that receives exhaust gases from the second bank of cylinders, and a conduit that conveys the exhaust gases from the first and second ports;

wherein the first and second ports are inwardly oriented towards the valley and the exhaust manifold extends longitudinally out from the valley and then back into the valley.

2. The marine engine according to claim 1, wherein the exhaust manifold comprises a 180 degree bend.

3. The marine engine according to claim 1, wherein the valley comprises opposite first and second ends with respect to the longitudinal axis and wherein the exhaust manifold extends out from and back into only one of the first and second ends.

4. The marine engine according to claim 3, wherein exhaust gas flows transversely from the first and second ports through the first end, and then back into the valley and out of the second end.

5. The marine engine according to claim 1, wherein at least a portion of the exhaust manifold is cast into the cylinder block.

6. The marine engine according to claim 5, wherein another portion of the exhaust manifold is bolted onto the marine engine.

7. A marine engine comprising:
a cylinder block having first and second banks of cylinders that are disposed along a longitudinal axis and extend transversely with respect to each other in a V-shape so as to define a valley;
a conduit that conveys the exhaust gas from the marine engine, wherein the conduit receives the exhaust gas from the first and second banks of cylinders and reverses direction only once with respect to the longitudinal axis;
wherein the conduit comprises a 180-degree bend that is located higher than first and second banks of cylinders with respect to the longitudinal axis and wherein the 180-degree bend conveys the exhaust gas from a vertically upward directional flow to a vertically downward directional flow with respect to the longitudinal axis.

8. The marine engine according to claim 7, wherein the valley has a center located proximate to the cylinder block and wherein the 180-degree bend carries the exhaust gas radially outwardly, away from the center.

9. A marine engine comprising:
a cylinder block having first and second banks of cylinders that are disposed along a longitudinal axis and extend transversely with respect to each other in a V-shape so as to define a valley;
a conduit that conveys the exhaust gas from the marine engine, wherein the conduit reverses direction only once with respect to the longitudinal axis;
wherein the conduit comprises a first branch conduit receiving exhaust gas from the first bank of cylinders, a second branch conduit receiving the exhaust gas from the second bank of cylinders and a third branch conduit receiving the exhaust gas from the first and second branch conduits and discharging the exhaust gas;
a sealing interface between the third branch conduit and the first and second branch conduits.

10. The marine engine according to claim 9, wherein the third branch conduit is attached to the first and second branch conduits by at least one fastener that extends through the sealing interface.

11. The marine engine according to claim 9, wherein the sealing interface comprises a planar seal surface that extends transversely to the longitudinal axis.

12. The marine engine according to claim 9, wherein the sealing interface is located higher than the first and second banks of cylinders with respect to the longitudinal axis.

13. The marine engine according to claim 9, wherein the third branch conduit merges the exhaust gas from the first and second branch conduits.

14. The marine engine according to claim 9, wherein the third branch conduit forms a 180-degree bend and wherein the 180-degree bend carries the exhaust gas from a vertically upward directional flow to a vertically downward directional flow.

15. A marine engine comprising:
a cylinder block having first and second banks of cylinders that are disposed along a longitudinal axis and extend transversely with respect to each other in a V-shape; and
a conduit that conveys the exhaust gas from the marine engine, wherein the conduit receives the exhaust gas from the first and second banks of cylinders and conveys the exhaust gas to an outlet, wherein the conduit reverses direction only once with respect to the longitudinal axis;
wherein the conduit further comprises a first branch conduit receiving exhaust gas from the first bank of cylinders, a second branch conduit receiving the exhaust gas from the second bank of cylinders and a third branch conduit receiving the exhaust gas from the first and second branch conduits and discharging the exhaust gas to the catalyst receptacle;
wherein the third branch conduit comprises a first conduit portion receiving exhaust gas from the first branch conduit, a second conduit portion receiving the exhaust gas from the second branch conduit, and a third conduit portion receiving the exhaust gas from the first and second conduit portions, and wherein the first and second conduit portions are separated by a dividing baffle.

16. The marine engine according to claim 15, wherein the third conduit portion forms a 90-degree bend.

17. The marine engine according to claim 15, wherein the first and second conduit portions form 90-degree bends.

18. The marine engine according to claim 9, wherein the engine is a four-stroke marine engine.

19. A marine engine comprising:
a cylinder block having first and second banks of cylinders that are disposed along a longitudinal axis and extend transversely with respect to each other in a V-shape;
a conduit that conveys the exhaust gas from the marine engine, wherein the conduit receives the exhaust gas from the first and second bank of cylinders, and conveys the exhaust gas to an outlet; wherein the conduit reverses direction only once with respect to the longitudinal axis;
wherein the conduit further comprises a first branch conduit receiving the exhaust gas from the first bank of cylinders, a second branch conduit receiving the exhaust gas from the second bank of cylinders, and a third branch conduit receiving the exhaust gas from the first and second branch conduits and discharging the exhaust gas; and wherein the conduit merges the exhaust gas from the first and second branch conduits together within a 180-degree bend.

20. A marine engine comprising:

a cylinder block having first and second banks of cylinders that are disposed along a longitudinal axis and extend transversely with respect to each other in a V-shape to define a valley therebetween; and a conduit at least partially disposed in the valley, the conduit conveying the exhaust gas from the marine engine, the conduit reversing direction only once with respect to the longitudinal axis;

wherein the conduit further comprises a first branch conduit receiving exhaust gas from the first bank of cylinders, a second branch conduit receiving the exhaust gas from the second bank of cylinders, the second branch conduit being separate from the first branch conduit, and a third branch conduit receiving the exhaust gas from the first and second branch conduits and discharging the exhaust gas; and wherein the third branch conduit comprises a first conduit portion receiving exhaust gas from the first branch conduit, a second conduit portion receiving the exhaust gas from the second branch conduit, and a third conduit portion merging the exhaust gas from the first and second conduit portions, and wherein the first and second conduit portions are separated by a dividing baffle.

\* \* \* \* \*